July 14, 1931.    A. R. PRIBIL    1,813,950
GUIDE PULLEY
Filed July 5, 1928
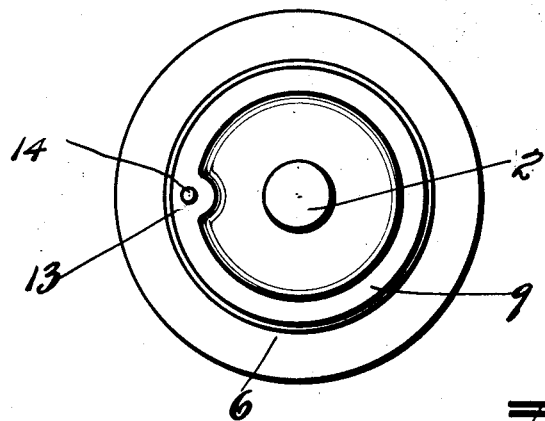
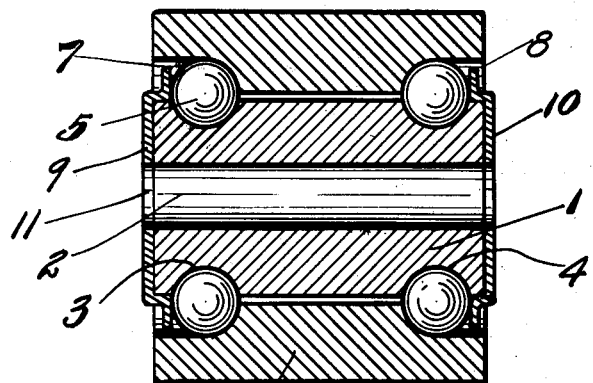
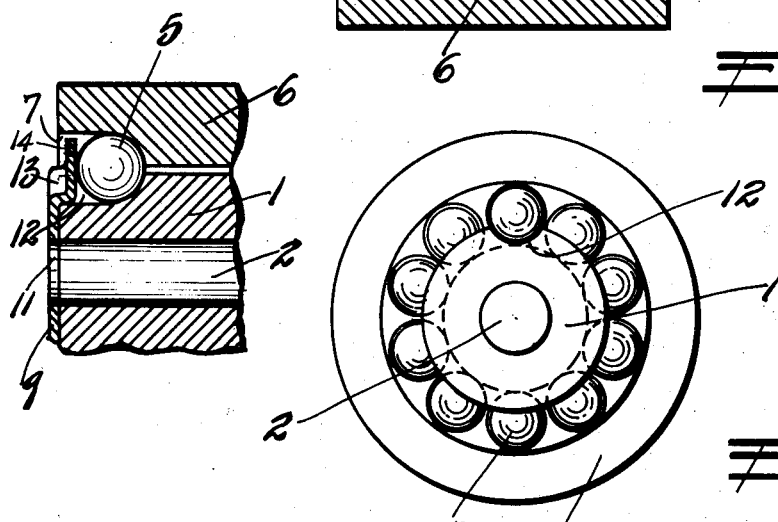
INVENTOR
Alexis R. Pribil.
BY Frank C. Farman
ATTORNEY

UNITED STATES PATENT OFFICE

ALEXIS R. PRIBIL, OF SAGINAW, MICHIGAN

GUIDE PULLEY

Application filed July 5, 1928. Serial No. 290,294.

This invention relates to guide rollers and the like, and particularly to a ball bearing guide roller such as used on roller turns, conveyers, and structures of similar nature.

One object of the invention is to provide a heavy duty guide roller of simple design and rigid construction, which will be smooth in operation, and easy to manufacture and assemble.

Another object is to provide a ball bearing guide roller in which the anti-friction balls can be easily assembled, and provide simple and inexpensive means for retaining the balls in position.

A further object is to provide a ball bearing guide roller of simple construction, capable of extremely heavy loads, to take care of heavy chain reactions, and pulls on endless chain conveyers which when carbonized and hardened will wear for an indefinite period of time without wear or repair.

The drawings illustrate a preferred embodiment of my invention, however it is to be understood that in adapting the same to meet different conditions, various changes in the form, proportion and minor details of construction may be resorted to, without departing from the nature of the invention as claimed hereinafter.

In the drawings:

Fig. 1 is a longitudinally sectional view through the guide roller.

Fig. 2 is an end view thereof.

Fig. 3 is a similar view of the opposite end with the end plate omitted and showing the passage for assembling the balls in the groove.

Fig. 4 is a fragmentary sectional view showing the depression in the end plate which forms a closure for the passage which admits the balls to the groove.

Referring now particularly to the drawings, the numeral 1 indicates the cone which is provided with a centrally disposed longitudinal bore 2 to accommodate the axle on which the pulley is mounted. Spaced apart grooves or races 3 and 4 respectively are provided on the cone and anti-friction balls 5 are adapted to be mounted therein in the usual manner.

An outer cylindrical roller member 6 is mounted on these balls, the ends being shouldered as shown at 7 and 8, the inner edge being rounded to conform to the curvature of the anti-friction balls, and takes the end thrust of the bearing. These balls are held in assembled position by means of stamped end plate members 9 and 10 respectively, said plate having a centrally disposed opening 11 to accommodate the axle, the outer edge being flanged to form a press fit with the ends of the cone, the upper end of said cone being provided with a longitudinally disposed groove 12 to admit the passage of the anti-friction balls when the structure is being assembled.

The guide roller is assembled by first placing the anti-friction balls in the groove 3 and then placing the roller thereover, the top row of balls is then inserted by feeding them through the groove 12, after which the end plates 9 and 10 are tightly pressed on the ends of the cone to exclude dust and foreign matter and retain the balls in position. The plate 10 is depressed as shown at 13 and projects into the passage 12 forming a closure therefor, a suitable oil hole 14 being provided in the plate for lubrication of the balls.

The bearing is designed to take both end and side thrust and consequently in no manner is effected by cramping or misalignment of the frame on which it is mounted.

The cone and roller are of course carbonized and hardened to eliminate wear and consequent sloppiness occasioned thereby.

From the foregoing description it will be obvious that I have perfected a very simple, substantial and smooth running guide roller composed of a minimum number of parts, which are economical to manufacture and easy to assemble.

What I claim is:—

1. A guide roller comprising a vertically disposed bored cone formed with spaced apart grooves, anti-friction balls mounted therein, a roller mounted thereon, the ends being counterbored to accommodate said balls, means for feeding said balls to said grooves, and stamped end plates pressed on and frictionally engaging the ends of the cone and forming a retainer and dust-proof closure for said balls.

2. A guide roller comprising a vertically disposed grooved cone, anti-friction balls mounted in said grooves, a roller mounted thereon and formed with counterbored ends adapted to accommodate said balls, a longitudinally disposed passage to permit assembling the balls in the groove, and stamped plates securely mounted on the ends of said cone and extending into said passage to form a closure therefor.

3. A guide roller comprising a grooved cone having a vertically disposed bore, anti-friction balls mounted in said grooves, a roller mounted thereon and formed with counterbored ends adapted to accommodate said balls, a passage in said cone to permit the assembly of said balls, and end plates securely mounted on the ends of the cone and provided with a depression extending into said passage.

4. A guide roller comprising a grooved cone having a centrally disposed bore, a passage opening into said groove, anti-friction elements mounted in said grooves, a roller mounted thereon and formed with counterbored ends adapted to accommodate said balls, end plates forming a closure for said counterbored ends and provided with a depressed portion which projects into said passage, and openings for lubricating said anti-friction elements.

In testimony whereof I hereunto affix my signature.

ALEXIS R. PRIBIL.